United States Patent
De Filippis

(10) Patent No.: US 8,022,590 B2
(45) Date of Patent: Sep. 20, 2011

(54) ELECTRIC MACHINE

(75) Inventor: Pietro De Filippis, Varazze (IT)

(73) Assignee: SPAL Automotive S.r.l (IT)

( * ) Notice: Subject to any disclaimer, the term of this patent is extended or adjusted under 35 U.S.C. 154(b) by 0 days.

(21) Appl. No.: 12/671,774

(22) PCT Filed: Jul. 23, 2008

(86) PCT No.: PCT/IB2008/002018
§ 371 (c)(1),
(2), (4) Date: Mar. 1, 2010

(87) PCT Pub. No.: WO2009/019563
PCT Pub. Date: Feb. 12, 2009

(65) Prior Publication Data
US 2010/0277032 A1 Nov. 4, 2010

(30) Foreign Application Priority Data
Aug. 7, 2007 (IT) ................ BO2007A0575

(51) Int. Cl.
*H02K 13/00* (2006.01)
*H02K 5/14* (2006.01)
*H02K 5/18* (2006.01)
*H02K 5/24* (2006.01)

(52) U.S. Cl. ............. 310/239; 310/245; 310/64; 310/51

(58) Field of Classification Search .................. 310/231, 310/89, 64, 65, 51, 238, 227, 239–247; *H02K 5/14, H02K 9/28, 39/38, 13/00, 5/24*
See application file for complete search history.

(56) References Cited

U.S. PATENT DOCUMENTS
4,822,441 A * 4/1989 Ohta et al. ............... 156/345.18
(Continued)

FOREIGN PATENT DOCUMENTS
DE 4243716 6/1994
(Continued)

OTHER PUBLICATIONS
Polyamides-imide, http://www.emcoplastics.com/index.cfm?fuseaction=product.display&product_ID=58&ParentCat=22.*
(Continued)

*Primary Examiner* — Quyen Leung
*Assistant Examiner* — Thomas Truong
(74) *Attorney, Agent, or Firm* — Timothy J. Klima; Shuttleworth & Ingersoll, PLC

(57) ABSTRACT

An electric machine comprises: a casing (2); a stator (3) and a rotor (4) supported by the casing (2), the rotor (4) having at least one rotor winding (7); a commutator (9) connected permanently to the rotor (4) and electrically connected to the rotor winding (7); a pair of brushes (12), each having a first end (12*a*) maintained in a sliding position with the commutator (9) and electrically connected to respective terminals which may be connected to an electricity mains supply; a pair of brush holder elements (11) supported by the casing (2), each brush holder element (11) being associated with a respective brush (12) to keep it pressed on the commutator (9). Each brush holder element (11) has at least one lateral surface (18) to face a respective butting position (17) of the casing (2), and which may be joined to the butting portion (17) to transmit a thermal power to the butting portion. The lateral surface (18) of each brush holder element (11) is electrically isolated from the respective butting portion (17).

16 Claims, 7 Drawing Sheets

U.S. PATENT DOCUMENTS

| | | | | |
|---|---|---|---|---|
| 5,159,222 A * | 10/1992 | Southall | ......................... | 310/239 |
| 5,608,280 A * | 3/1997 | Tamemoto et al. | ............ | 310/239 |
| 5,648,693 A * | 7/1997 | Katoh et al. | ................. | 310/67 R |
| 5,939,812 A * | 8/1999 | Wetzel | ............................ | 310/245 |
| 6,608,423 B2 * | 8/2003 | Tam | ................................ | 310/239 |
| 6,664,700 B2 * | 12/2003 | Yamada et al. | ................ | 310/239 |
| 6,707,177 B1 * | 3/2004 | Campbell et al. | ................. | 310/45 |
| 6,713,932 B2 * | 3/2004 | Shiina et al. | .................... | 310/239 |
| 2007/0007846 A1 * | 1/2007 | Niimi | ............................ | 310/239 |

FOREIGN PATENT DOCUMENTS

| | | | |
|---|---|---|---|
| DE | 19717594 | A1 * | 10/1998 |
| DE | 29803270 | | 7/1999 |
| JP | 2001016817 | A * | 1/2001 |
| JP | 2008253026 | A * | 10/2008 |

OTHER PUBLICATIONS

Diaham, Dielectric and Thermal Properties of Polyamide-imide (PAI) films, Dec. 6, 2010, IEEE, p. 1.*

DE29803270, Google Translation, http://translate.google.com/.*

European Search Report dated May 15, 2009 from counterpart patent application.

\* cited by examiner

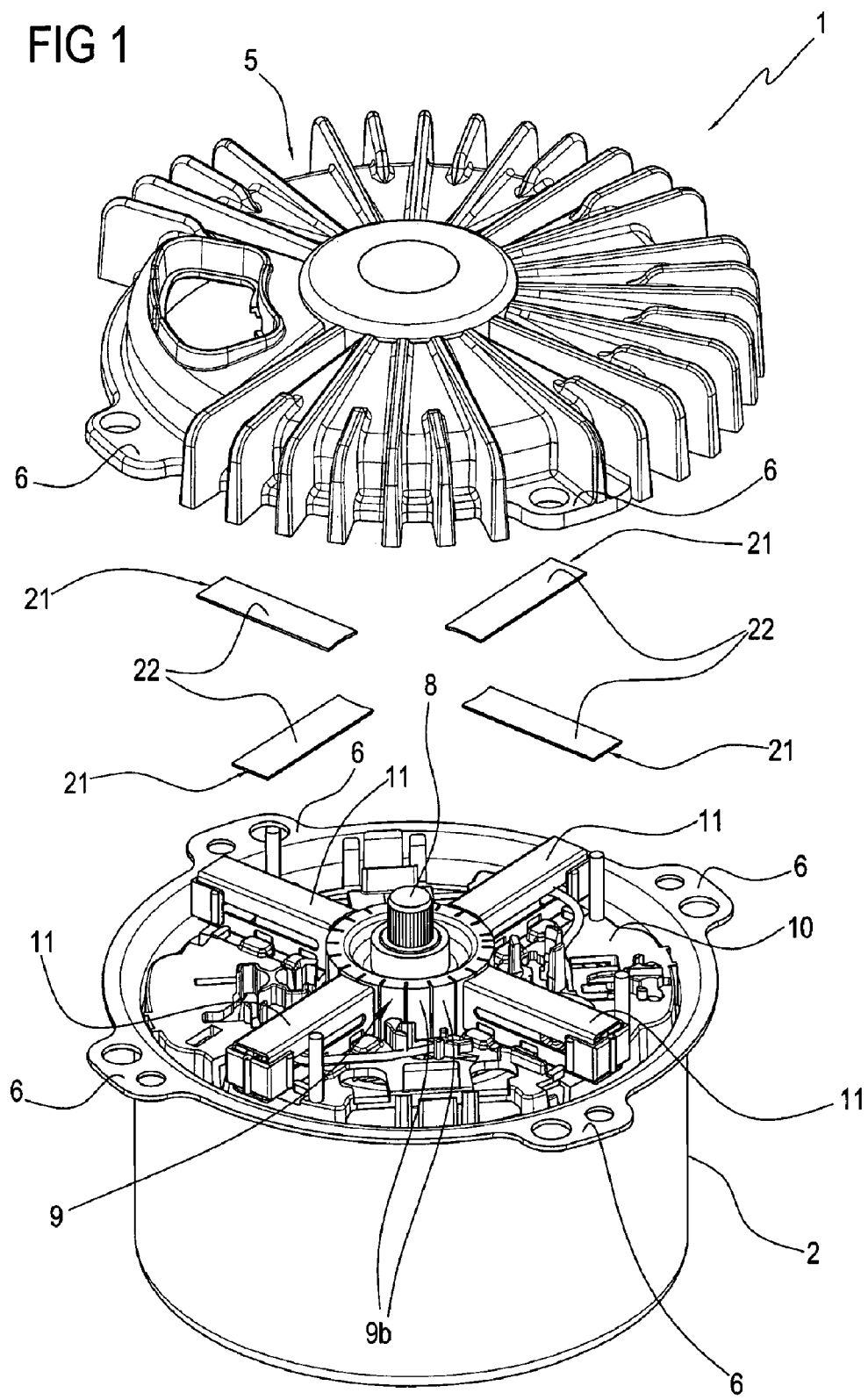

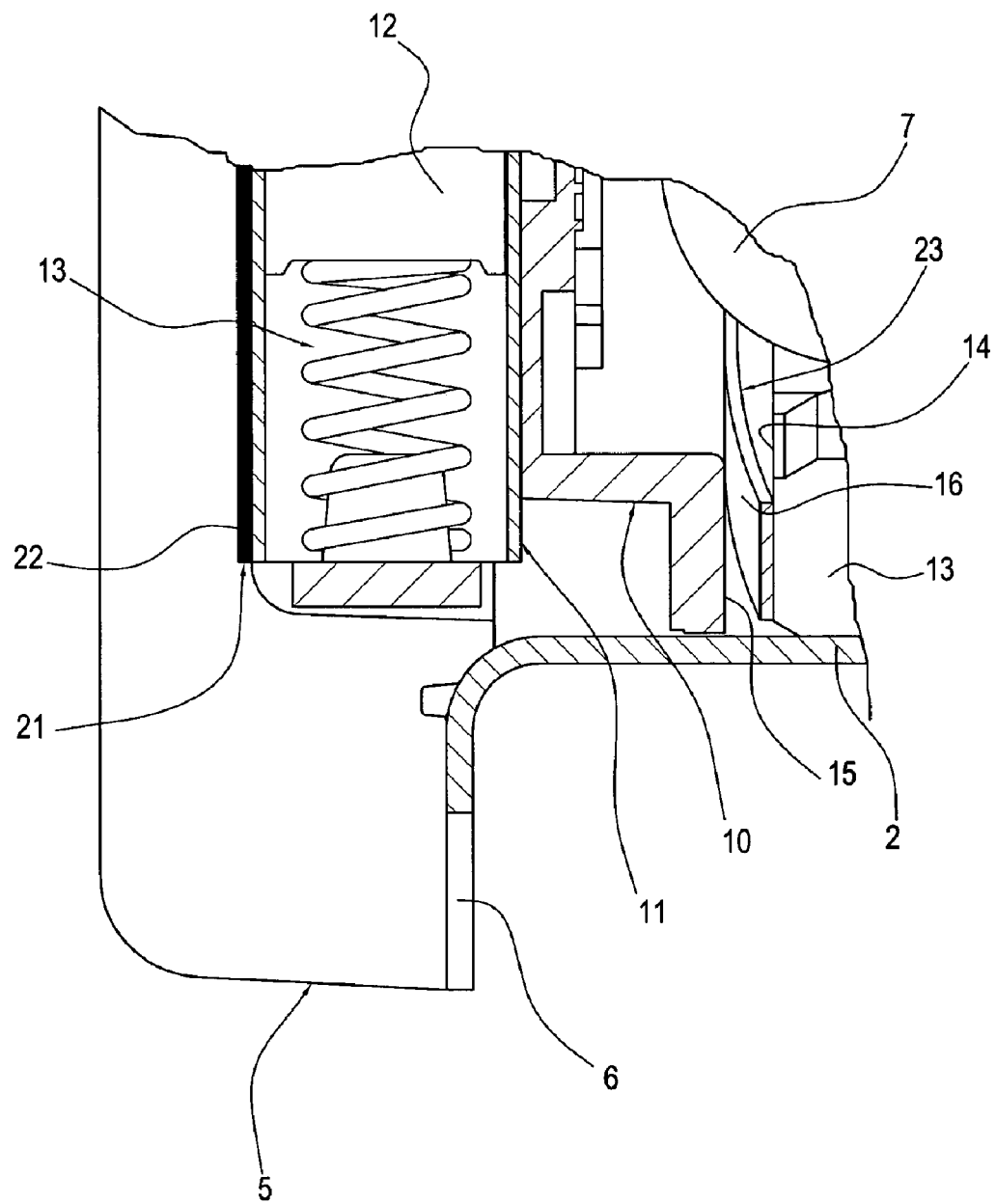

ELECTRIC MACHINE

CROSS-REFERENCE TO RELATED APPLICATIONS

This application is the National Phase of International Application PCT/IB2008/002018 filed Jul. 23, 2008 which designated the U.S. and that International Application was published under PCT Article 21(2) in English.

This application claims priority to Italian Patent Application No. BO2007A000575 filed Aug. 7, 2007, and PCT Application No. PCT/IB2008/002018 filed Jul. 23, 2008, which applications are incorporated by reference herein.

TECHNICAL FIELD

This invention relates to an electric machine.

In particular, the invention relates to a rotary electric machine of the commutator type, and, even more specifically, a sealed electric machine, for example a motor of the type used to drive an electric cooling fan for automotive applications or an electricity generator. Preferably, the electric machine according to this invention is of the type powered with direct current.

BACKGROUND ART

Prior art commutator type electric machines comprise a rotor, a stator and a commutator, integral with the rotor, on which a plurality of brushes are active defining sliding electrical contacts. These sliding electrical contacts enable a connection between the rotor windings, fitted to the rotor, and an electrical circuit which may be connected to the electricity mains supply that may also be connected to stator windings if the stator is not of the permanent magnets type.

The power supplied by the commutator electric machines is directly linked to the current circulating in the rotor windings, which, therefore, passes through the commutator and the brushes. The current passing through the brushes, which also has high nominal values, heats the brushes due to the Joule effect, and the brushes heat further due to their sliding on the commutator bars.

Electric motors of the conventional type comprise special brush holder elements, also known as brush holder casings, which are integral with a support element made of plastic material supported by the stator and by a casing outside the electric machine. Prior art brush holder elements have a tubular shape extending in a radial direction with respect to the rotor, that is to say, in a direction perpendicular to the axis of rotation of the rotor. The brushes slide inside the respective brush holder element under the action of a contrast spring which keeps an end of the brush pressed against the commutator to avoid reciprocal displacements between brush and commutator. Usually, each brush is electrically connected to the supply circuit by the same brush holder element, made of metal. The brushes are generally made of conductive material, in particular graphite possibly combined with other materials, such as phenolic resin or metal powders.

In addition, the support element is packed with the stator and held in position against the stator by a thrust force imparted by a cover outside the casing. The support element, which, as already mentioned, is made of plastic material, has elastic protrusions also made of plastic material, active between the support element and the stator to absorb thermal deformations or assembly tolerances of the support element.

Due to the known shape of the electric motors of the closed type, the brush holder element is immersed in a sealed environment subjected to continuous heating due essentially to the Joule effect caused by the passage of current through the rotor windings (and, possibly, the stator windings, too). This sealed environment is not subject to an air exchange, and, under steady-state conditions, the temperatures in this environment may be as high as 200° C. or more. This seriously penalises the heat dispersion of the brushes, which therefore tend to overheat, reaching unacceptable temperatures for their correct operation.

It has actually been found that the materials ordinarily used on a large scale to manufacture the brushes have wear resistance and electrical conductivity properties which remain at acceptable levels up to temperatures which are much lower than those reached in sealed electric motors and in particular these properties are maintained for temperatures up to approximately 150° C. When this limit has been exceeded, the decay of the electrical performance of the brushes as well as their deterioration (wear) increases in an unacceptable manner, and this leads to rapid wear of the electric machine which, after a short time, must be replaced or undergo maintenance.

Where the brush holder element is made of plastic material, the negative effect of the temperature increase is even more penalising due to the very poor heat exchange properties of the plastic materials. A brush holder element made of plastic material results in the brush operating almost in a situation of thermal insulation with respect to the outside, thus causing the brush to reach even higher temperatures compared with the case of metal brush holders.

For this reason, sealed motors are currently known in which the brushes and the brush holder elements are oversized compared with the dimensions they would have if installed in an open electric machine, that is to say, in a machine in which there is an exchange of air drawn from the outside, so as to reduce the overheating due to the Joule effect and to favour the heat exchange with the environment inside the electric machine. Disadvantageously, the above-mentioned over sizing has a negative influence both on the dimensional aspects of the electric machine, making it larger, and on the manufacturing cost of the machine itself.

DISCLOSURE OF THE INVENTION

The aim of the present invention is therefore to provide an electric machine that is free of the above-mentioned shortcomings.

One aim of the present invention is to provide an electric machine with a high level of reliability.

Another aim of the invention is to provide an electric machine which is inexpensive to manufacture.

Yet another aim of the invention is to provide an electric machine with a small overall size.

The stated technical purposes and aims, and others, are substantially achieved by an electric machine as described in claim 1 and in one or more of the claims dependent thereon.

BRIEF DESCRIPTION OF THE DRAWINGS

Further features and advantages of the present invention are more apparent in the detailed description below, with reference to a preferred, non-limiting, embodiment of an electric machine, as illustrated in the accompanying drawings, in which:

FIG. 1 illustrates a perspective exploded view of an electric machine according to the present invention;

FIG. 2c illustrates an enlarged section view of a portion of the view in FIG. 2b;

DETAILED DESCRIPTION OF THE PREFERRED EMBODIMENTS OF THE INVENTION

Figure 2A:
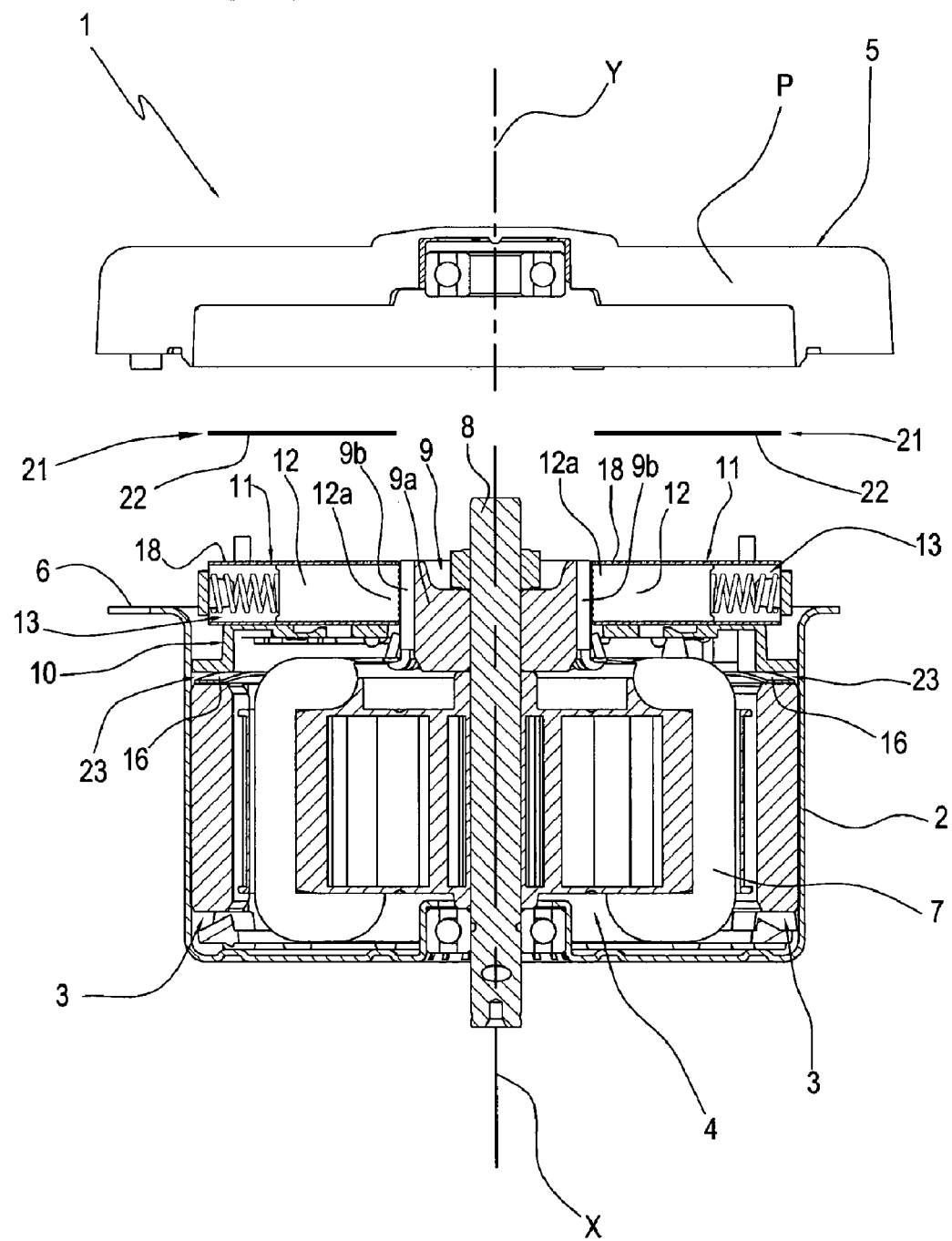
FIG. 2a illustrates an exploded section view of the electric machine of FIG. 1 in an assembly configuration.

The electric machine described in detail below is specifically an electric motor. However, the technical characteristics and the teachings of the present invention also apply to other rotary electric machines of the brush-commutator type, in particular to electricity generators.

With reference to the accompanying drawings, the numeral 1 denotes in its entirety an electric motor according to the present invention.

The electric motor 1 comprises a casing 2, inside of which are housed a stator 3 and a rotor 4, and a covering element 5 or cover which is permanently associated with the casing 2 by the joints of special flanges 6 formed on the casing 2 and on the covering element 5.

In an assembled configuration of the motor 1, the casing 2, the stator 3 and the rotor 4 extend around a single axis coinciding with the axis of rotation "X" of the rotor 4.

The rotor 4 has at least one winding obtained by winding a lead wire around a polar expansion of the rotor 4 according to a plurality of turns. The winding is schematically indicated with numeral 7 in the accompanying drawings.

The stator 3 is represented as a permanent magnets type.

The rotor 4 comprises a shaft 8 coaxial with the axis "X" of the rotor 4, and a commutator 9 keyed on the shaft 8 and, therefore, integral with the shaft 8. The commutator 9 is of the conventional bar type, and, in detail, comprises a cylindrical core 9a fitted with a plurality of bars 9b running side by side circumferentially round the core 9a. Each bar 9b is electrically connected to a portion of the winding 7 and it is insulated from the other bars 9b.

The electric motor 1 also comprises a support element 10, with a discoidal shape and preferably made of plastic material, which extends around the above-mentioned axis "X" of the rotor 4 and supports at least a pair of brush holder elements 11 angularly spaced around the axis "X" of the rotor 4. Each brush holder element 11 houses a sliding brush 12 which, under the action of a known type of contrast means 13 such as a helical spring, is maintained pressed against the bars 9b of the commutator 9. In particular, an end 12a of each brush 12 is maintained in a sliding position with the bars 9b of the commutator 9.

The brush holder element 11 therefore acts as a guide of the brush 12 and it enters into contact with the brush 12. The brush holder element 11 is also connected to respective terminals (not illustrated) and may be connected to an electrical circuit of the motor 1, and determines an electrical continuity between the electrical circuit and the brush 12 and, therefore, the respective portion of the winding 7.

For that purpose, the brush holder element 11 is preferably made from a conductive metallic material, preferably copper.

The brush holder element 11 has a tubular form, preferably a prismatic section and even more preferably rectangular or square, and it extends along a direction incident with respect to the axis "X" of the rotor 4, that is to say, along a direction which departs from the axis "X" of the rotor 4.

Figure 4:
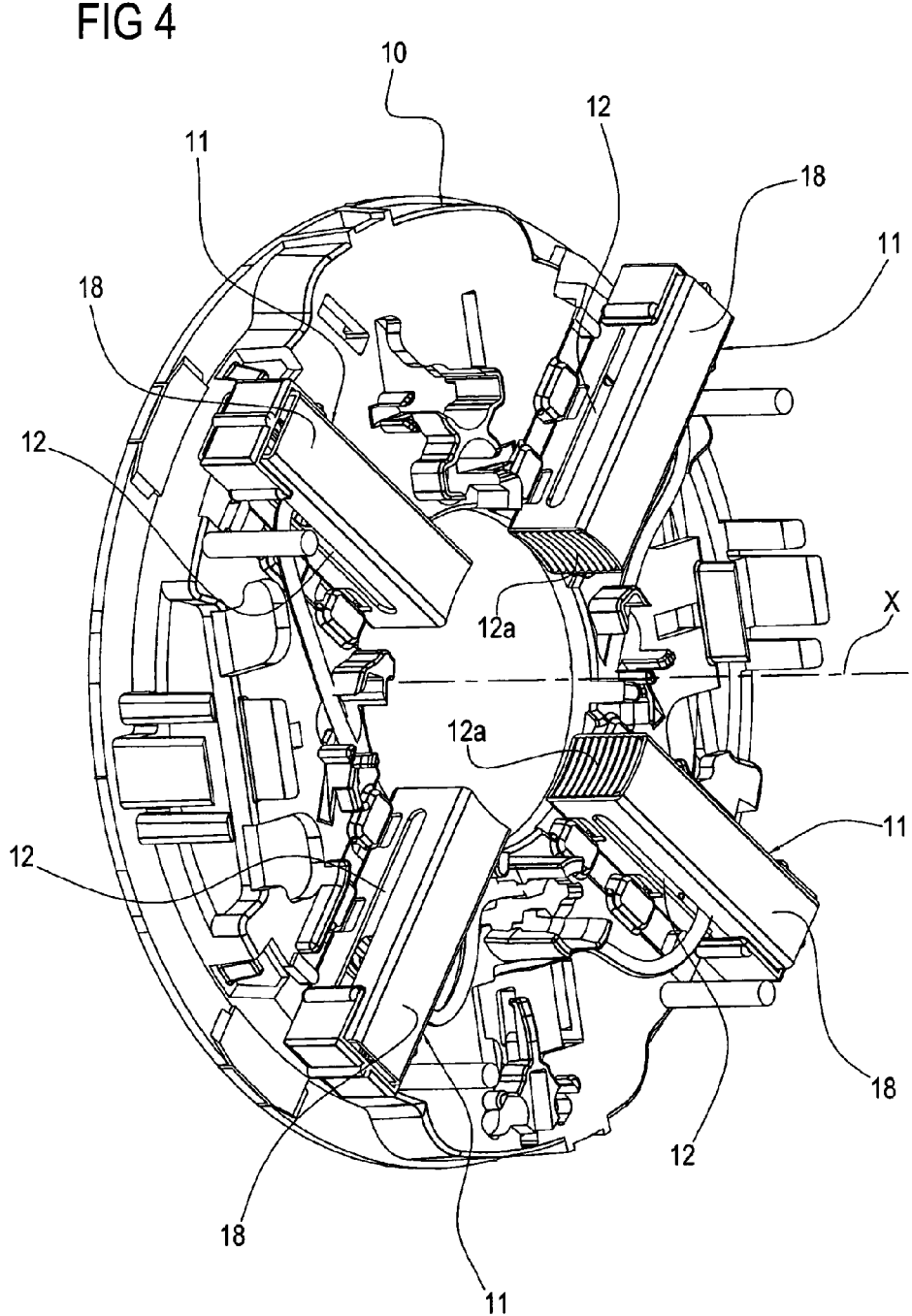
FIG. 4 illustrates a first perspective view of a second portion of the electric machine in FIG. 1 with some parts cut away to better illustrate others.

In the embodiment illustrated in FIGS. 1 and 4, the support element 10 supports four brush holder elements 11 spaced at equal angular intervals around the axis "X" of the rotor 4 and permanently connected to the support element 10.

The support element 10 is packed with the stator 3, that is, with the casing 2, in particular against a reference surface 14 of the stator 3 in order to be positioned in a predetermined position along the axis "X" of the rotor 4 to keep the brushes 12 in contact with the bars 9b of the commutator 9.

Figure 5:
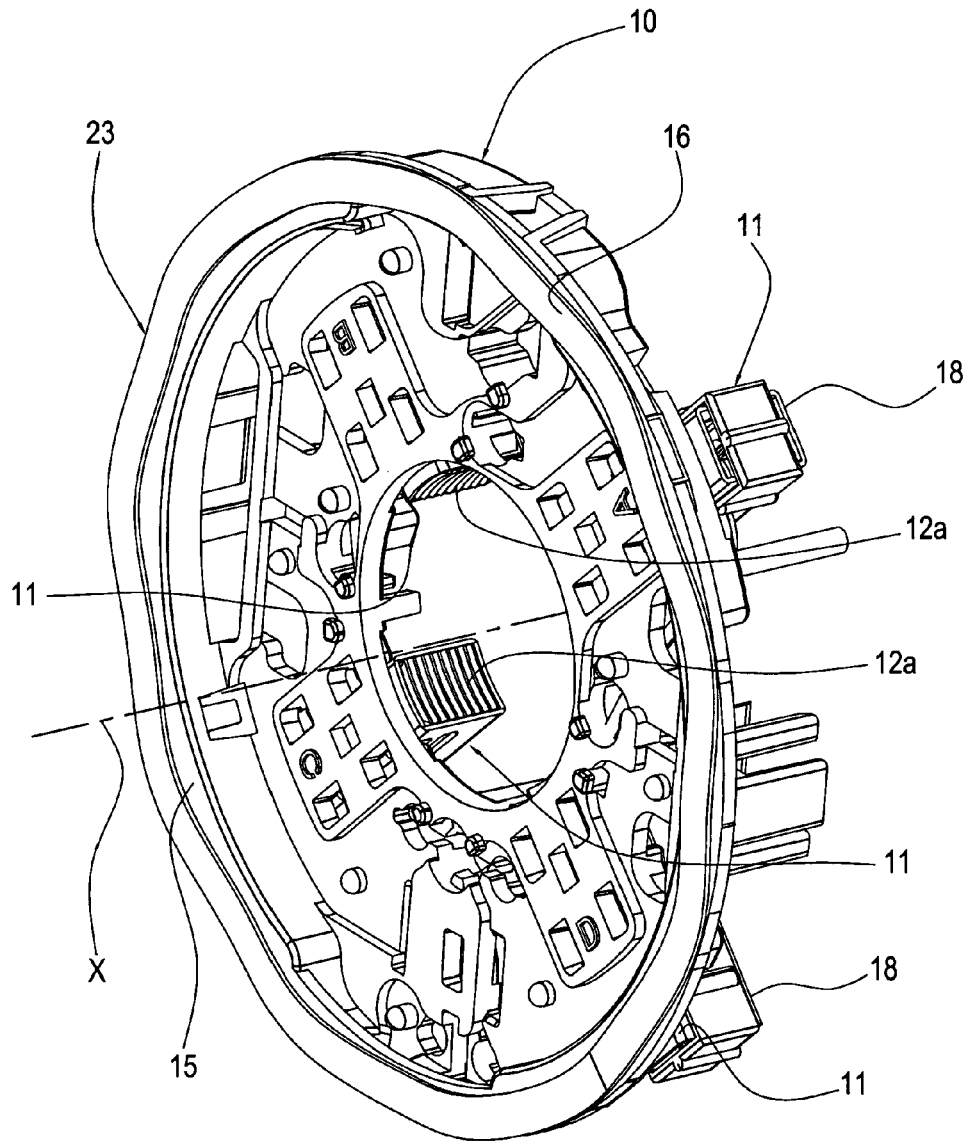
FIG. 5 illustrates a second perspective view of the portion of FIG. 4.

According to the view of FIG. 5, the support element 10 has, at a face opposite the brush holder elements 11, an engagement surface 15 directly engageable by thrust means 23 designed to operate by compression and to maintain an air space between the engagement surface 15 and the reference surface 14. The engagement surface 15 and, preferably, also the reference surface 14, have an annular shape and lie in planes parallel to each other. More in detail, the above-mentioned thrust means 23 are active between the reference surface 14 and the engagement surface 15 to generate a repulsive action between the surfaces 14, 15, that is to say, to generate a thrust on the support element 10 towards the covering element 5. The above-mentioned repulsive action imparted by the thrust means 23 tends to move the support element 10 and the reference surface 14 away from each other, so that the support element 10 receives a thrust in the direction of the covering element 5 or cover.

Figure 2B:
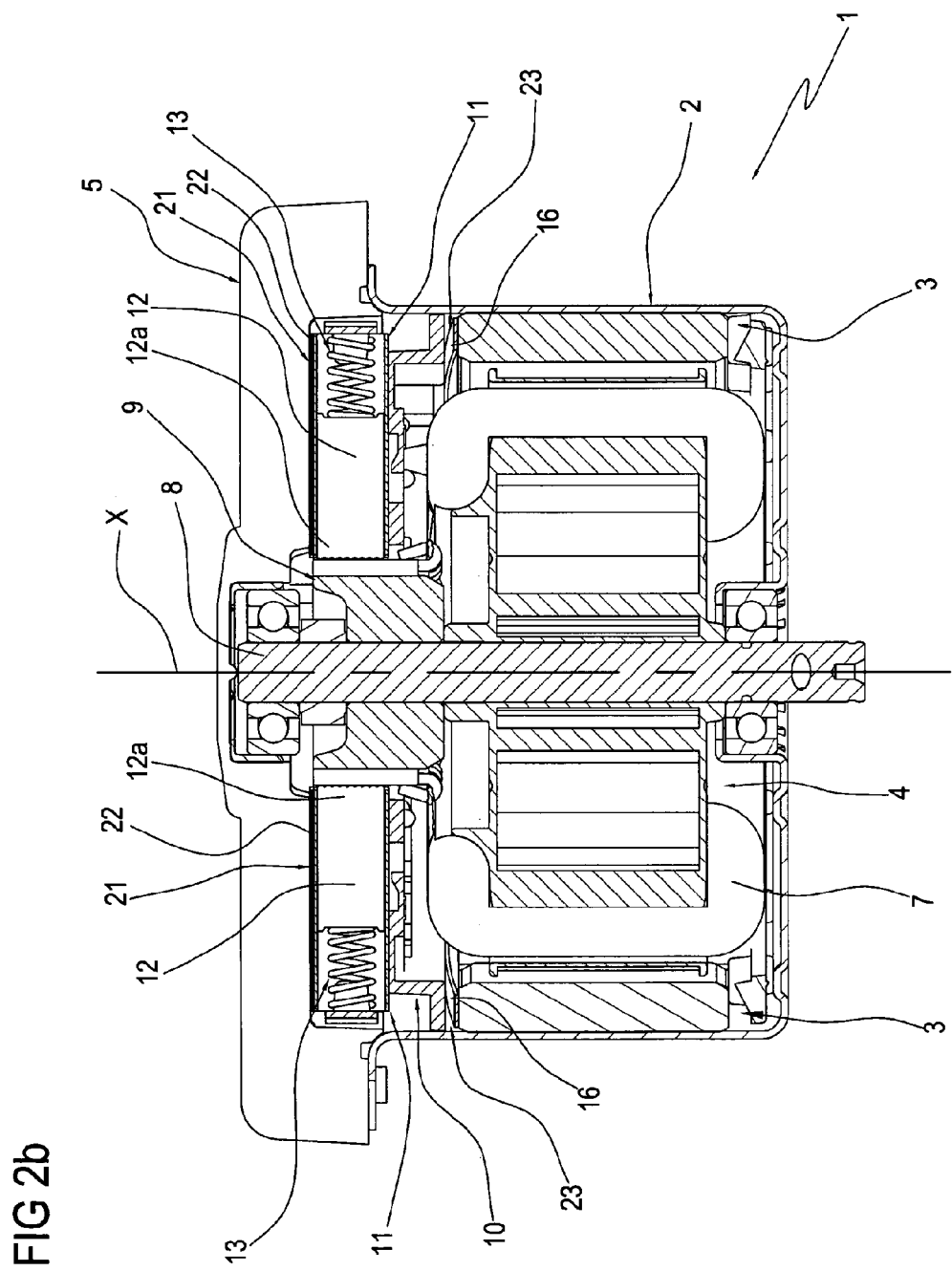
FIG. 2b illustrates an enlarged section view of a portion of the view in FIG. 2a in an assembled configuration.

According to a preferred embodiment illustrated in FIGS. 2a to 2c and in FIG. 5, the thrust means 23 comprise an elastic element 16, preferably made from an undulating plate having a substantially annular shape. The elastic element 16 is placed along at least a part of, preferably all the way around, the above-mentioned reference surfaces 14 and engagement surfaces 15. In addition, the elastic element 16, due to the above-mentioned undulating shape, has some portions in contact exclusively with the reference surface 14, and other portions exclusively in contact with the engagement surface 15, such that the contrast element 16 is subjected to a bending stress.

The elastic element 16 is compressed (along the axis "X" of the rotor 4) during the assembly of the electric motor 1, which occurs, for example, joining the elastic element 16 to the reference surface 14 and then placing on the elastic element 16 the support element 10 and the covering element 5. Packing and permanently fixing the covering element 5 with the casing 2 compresses the elastic element 16 which maintains an elastic reaction of the repulsive type between the above-mentioned reference surfaces 14 and engagement surfaces 15.

The elastic element 16 is made preferably from metal, and even more preferably from steel.

Figure 3:
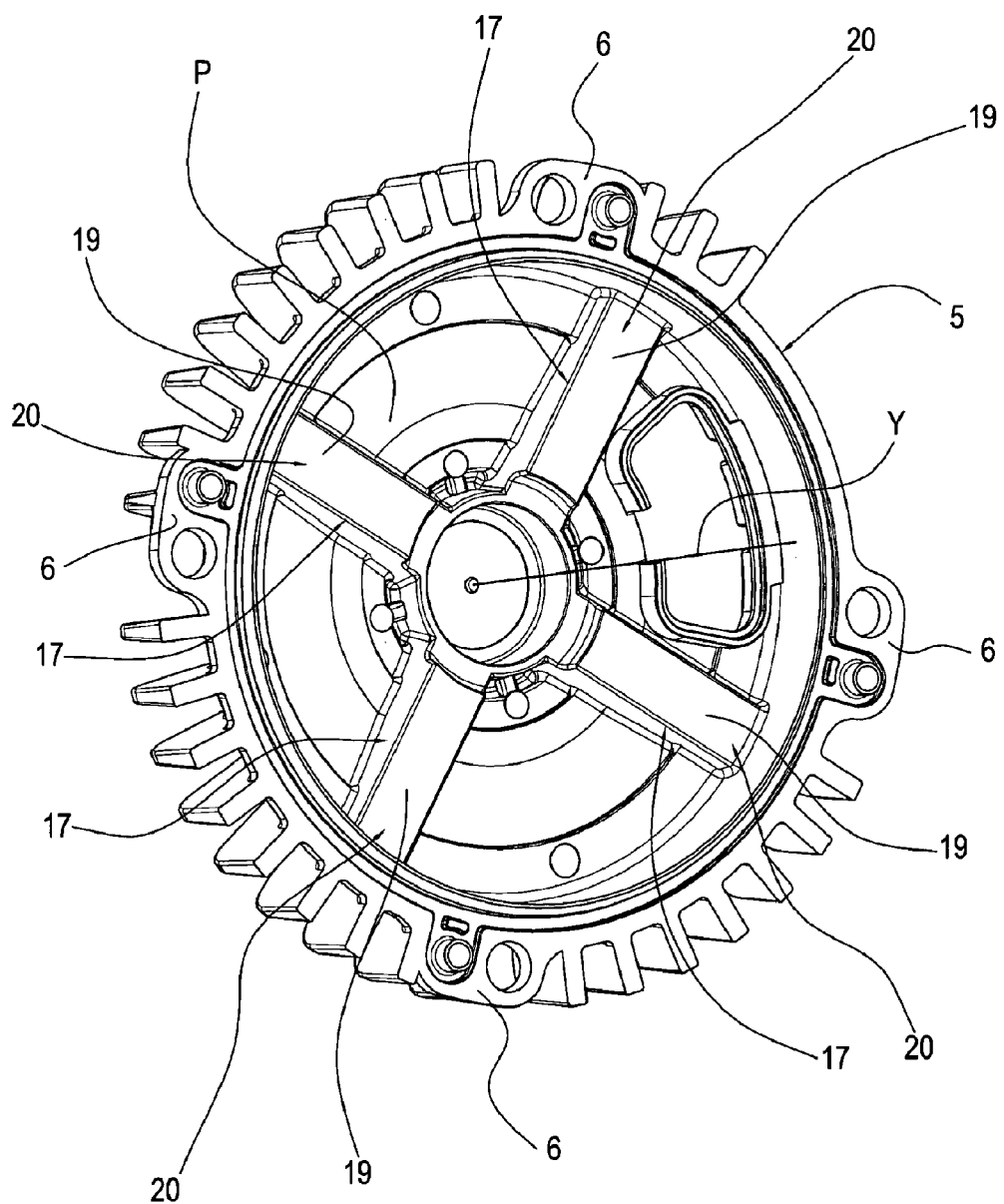
FIG. 3 illustrates a perspective view of a first portion of the electric machine of FIG. 1 with some parts cut away to better illustrate others.

With reference to the FIG. 3, the covering element 5 has at least a pair of butting portions 17 each of which abuts a respective brush holder element 11. More precisely, each brush holder element 11 has a flat lateral surface 18 which may be engaged, by supporting, with one of the above-mentioned butting portions 17. For this purpose, each butting portion 17 has a butting surface 19 shaped to match the lateral surface 18 of the corresponding brush holder element 11, preferably flat and parallel to the lateral surface 18 of the corresponding brush holder element 11.

Looking in more detail, the covering element 5 defines a wall "P" having a cap shape and lying perpendicular to an axis "Y" of the covering element 5 to coincide with the axis of rotation "X" of the rotor 4. Each of the above-mentioned butting portions 17 is defined by a protrusion 20 of the above-mentioned covering element 5, and the protrusion 20 extends away from the covering element 5 and it faces towards a space inside motor 1. Each protrusion 20 also has one of the above-mentioned butting surfaces 19, which is oriented perpendicularly to the axis "Y" of the covering element 5.

The view of FIG. 3 shows the covering element 5 with four protrusions 20 spaced at equal angular intervals around the axis "Y" of the covering element 5.

Advantageously, between the above-mentioned lateral surface 18 of each brush holder element 11 and the respective butting surface 19 there is an intermediate element 21 having thermal conductivity and electrical insulation properties. The above-mentioned intermediate element 21 extends mainly in one plane over an area at least equal to a potential area of contact between the above-mentioned lateral surface 18 and the respective butting surface 19.

The intermediate element 21 comprises preferably a removable shim 22 made of Silpad®, rigid or flexible, having compressive strength properties which may be placed between the above-mentioned lateral surface 18 and the respective butting surface 19 to favour heat exchange between these surfaces whilst maintaining them electrically insulated from one another.

Advantageously, after assembly of the covering element 5 on the casing 2, the elastic element 16 defines the above-mentioned thrust means 23 active between the casing 2, that is, the stator 3, and the support element 10 to maintain the latter pressed against the covering element 5. Since the elastic element 16 acts from the opposite side of the support element 10 with respect to the brush holder elements 11, the elastic element 16 generates a thrust which maintains the above-mentioned lateral surfaces 18 of the brush holder elements 11 pressed against the butting surfaces 19. This results in a significant advantage if shims 22 made of Silpad® are used, the electrical insulation and thermal conductivity properties of which reach optimum values only when the shims 22 are subjected to a substantial surface pressure, in particular equal to at least 1.5 kg/cm$^2$. In this circumstance, by suitably dimensioning the elastic element 16 it is possible to maintain a constant thrust on the shims 22 with a pre-set value, in particular greater than 1.5 kg/cm$^2$.

To achieve the above-mentioned pressing effect, the support element 10 is fitted to the casing 2 in a sliding manner along the axis "X" of the rotor 4. The extent of the sliding allowed by the support element 10 is maintained within limits linked to the need to maintain the brushes 12 in contact with the commutator 9.

Preferably, the covering element 5 also has, on the opposite side to the protrusions 20, an outer finned surface to facilitate a heat exchange between the covering element 5 and an environment outside the motor 1, as may be partially seen in the view in FIG. 3.

The present invention achieves the above-mentioned aims and overcomes the shortcomings of prior art.

The electric machine according to the present invention provides an effective cooling action thanks to the adoption of Silpad® shims which enable heat exchange by conduction between the brush holder elements and the casing without their closeness generating short circuits. Consequently, it is possible contain the maximum operating temperatures of the brushes, which transmit a thermal power to the respective brush holder elements and this thermal power is carried to the outside of the electric machine by means of the above-mentioned Silpad® shims. The brushes and the brush holder elements may therefore be used more since the effective removal of the heat enables a substantial reduction in the wear of the brushes and maintains the optimum conductivity properties of the brush and of the metal from which the brush holder elements are made.

In addition, the presence of the thrust means active on the support element, and, therefore, on the brush holder elements, enables a substantially constant thrust action to be maintained, with a desired value, of the brush holder elements against the protrusions of the casing. This thrust may be in particular determined to achieve an optimum operation of the Silpad® shims. Moreover, the mechanical compressive strength exhibited by the Silpad® shims enables the shims to be "clamped" between the brush holder elements and the protrusions and, at the same time, to make an important contribution to the thermal conductivity and electrical insulation.

Lastly, the manufacture of the elastic element in a metallic material, in particular steel, enables the elastic element to maintain its strength and elastic properties even at high temperatures, unlike the conventional electric machines in which the protrusions of the support element made of plastic material soon lose their mechanical properties due to the high temperatures to which they are subjected. The above-mentioned maintaining of the strength and elasticity properties of the metallic elastic element enables a constant thrust to be maintained over time even when subjected to high temperatures such as those which occur in an electric machine of the sealed type.

What is claimed is:

1. An electric machine comprising:
   a casing
   a stator and a rotor supported by the casing, the rotor having at least one rotor winding;
   a commutator connected permanently to the rotor and electrically connected to the rotor winding;
   at least one pair of brushes, each brush having a first end slidably engaged with the commutator and being electrically connected to respective terminals which may be connected to an electricity mains supply;
   at least one pair of brush holder elements supported by the casing, each brush holder element being associated with a respective brush to keep it pressed on the commutator;
   each brush holder element having at least one lateral surface to face a butting portion of the casing and which may be joined to the butting portion to transmit thermal power to the butting portion, the lateral surface being electrically isolated from the butting portion;
   the casing comprising a wall lying in a plane substantially perpendicular to an axis of rotation of the rotor, the butting portion being positioned on the wall and facing a space inside the electric machine;
   an elastic element active between the casing and the brush holder elements to provide a force against the brush holder elements toward the wall in an axial direction of the casing parallel to the axis of rotation of the rotor to maintain the lateral surfaces of the brush holder elements axially pressed against the butting portion;
   a support element slideable along the axis of rotation of the rotor and on which the brush holder elements are permanently fitted, the elastic element being operationally active between the casing and the slideable support element; and
   the elastic element having an annular shape, the slideable support element having a discoidal shape, the elastic element being active on a periphery of the slideable support element.

2. The machine according to claim 1, and further comprising at least one thermally conductive and electrically insulating intermediate element, the intermediate element having at least mechanical compressive strength and being placed between the lateral surface of the brush holder element and the respective butting portion to facilitate heat exchange between them whilst keeping them electrically isolated from one another.

3. The machine according to claim 2, wherein the intermediate element may be fitted in a removable manner between the lateral surface of the brush holder element and the respective butting portion.

4. The machine according to claim 1, wherein the elastic element is an undulating plate operating by bending stress.

5. The machine according to claim 1, wherein the lateral surface, facing the respective butting portion, is oriented perpendicularly to the axis of rotation of the rotor.

6. The machine according to claim 1, wherein the lateral surface of the brush holder element engages with and supports the respective butting portion.

7. The machine according to claim 2, wherein the intermediate element comprises a shim extending mainly in one plane and having dimensions at least equal to a potential surface of contact between the lateral surface and the respective butting portion.

8. The machine according to claim 1, wherein, the butting portion is defined by a protrusion of the wall.

9. The machine according to claim 8, wherein the wall is defined by a removable covering element associated with a remaining part of the casing.

10. The machine according to claim 9, wherein the protrusion extends away from the wall in the axial direction.

11. The machine according to claim 8, wherein the protrusion has a butting surface shaped to match the lateral surface of each brush holder element.

12. The machine according to claim 11, wherein the butting surface is flat and perpendicular to the axis of rotation of the rotor.

13. The machine according to claim 9, wherein the covering element has a finned outer surface to favor heat exchange between the wall and an outside of the electric machine.

14. The machine according to claim 1, and further comprising a plurality of butting portions, each butting portion engaging with a respective lateral surface of a brush holder element.

15. The machine according to claim 8, wherein the wall has a plurality of protrusions spaced at equal angular intervals and each of which engages with a respective lateral surface of a brush holder element.

16. An electric machine comprising
a casing;
a stator and a rotor supported by the casing, the rotor having at least one rotor winding;
a commutator connected permanently to the rotor and electrically connected to the rotor winding;
at least one pair of brushes, each brush having a first end slidably engaged with the commutator and being electrically connected to respective terminals which may be connected to an electricity mains supply;
at least one pair of brush holder elements supported by the casing, each brush holder element being associated with a respective brush to keep it pressed on the commutator;
each brush holder element having at least one lateral surface to face a respective butting portion of the casing and which may be joined to the butting portion to transmit thermal power to the butting portion, the lateral surface being electrically isolated from the butting portion;
a thrust mechanism active between the casing and the brush holder elements to maintain the lateral surfaces of the brush holder elements pressed against the butting portion;
a support element slideable along the axis of rotation of the rotor and on which the brush holder elements are permanently fitted, the thrust mechanism being operationally active between the casing and the slideable support element;
the thrust mechanism comprising an elastic element having an annular shape, the slideable support element having a discoidal shape, the elastic element being active on a periphery of the slideable support element.

* * * * *